United States Patent [19]

Johnson et al.

[11] Patent Number: 5,261,458
[45] Date of Patent: Nov. 16, 1993

[54] PILOT RELAY VALVE WITH LOAD PISTON

[75] Inventors: Duane R. Johnson, Wellington; Robert J. Herbst, Avon; James E. Fent, Ridgeville; James G. Pugh, Elyria; Paul O. Szentkiralyi, Lakewood, all of Ohio

[73] Assignee: Allied-Signal Inc., Morristown, N.J.

[21] Appl. No.: 874,904

[22] Filed: Apr. 28, 1992

[51] Int. Cl.$^5$ .............. F16K 11/04; B60T 15/02
[52] U.S. Cl. .................. 137/627.5; 137/596.18; 251/282; 303/28; 303/40
[58] Field of Search .......... 137/627.5, 596.18; 251/282; 303/28, 29, 40

[56] References Cited

U.S. PATENT DOCUMENTS

| | | | |
|---|---|---|---|
| 2,859,763 | 11/1958 | Fites | 137/627.5 X |
| 3,105,508 | 10/1963 | Bowditch et al. | 137/627.5 X |
| 3,252,471 | 5/1966 | Olson | 137/627.5 X |
| 3,284,142 | 11/1966 | Bueler | 137/627.5 X |
| 3,399,933 | 9/1968 | Alfieri et al. | 137/627.5 X |
| 3,584,652 | 6/1971 | Huntington | 137/627.5 |
| 3,646,969 | 3/1972 | Stampfli | 137/627.5 |
| 3,752,190 | 8/1973 | Brake | 251/282 X |
| 4,181,367 | 1/1980 | Herring et al. | 303/40 X |

OTHER PUBLICATIONS

A Brochure, #91-015, "R8-P Relay Valve", Company unknown, Date unknown.

Primary Examiner—John Rivell
Attorney, Agent, or Firm—Ken C. Decker; W. N. Antonis

[57] ABSTRACT

A relay valve for a fluid pressure braking system includes a relay piston and a load piston which is responsive to the pressure at the inlet port of the relay valve to exert a biasing force on the relay piston loading the latter against the inlet/exhaust valve. The biasing force is opposed by fluid pressure at the inlet port acting across the effective area of the inlet/exhaust valve. The biasing force is greater than the spring force holding the inlet/exhaust valve closed, so that the valve responds immediately to pressure signals transmitted through the control port of the relay valve.

9 Claims, 1 Drawing Sheet

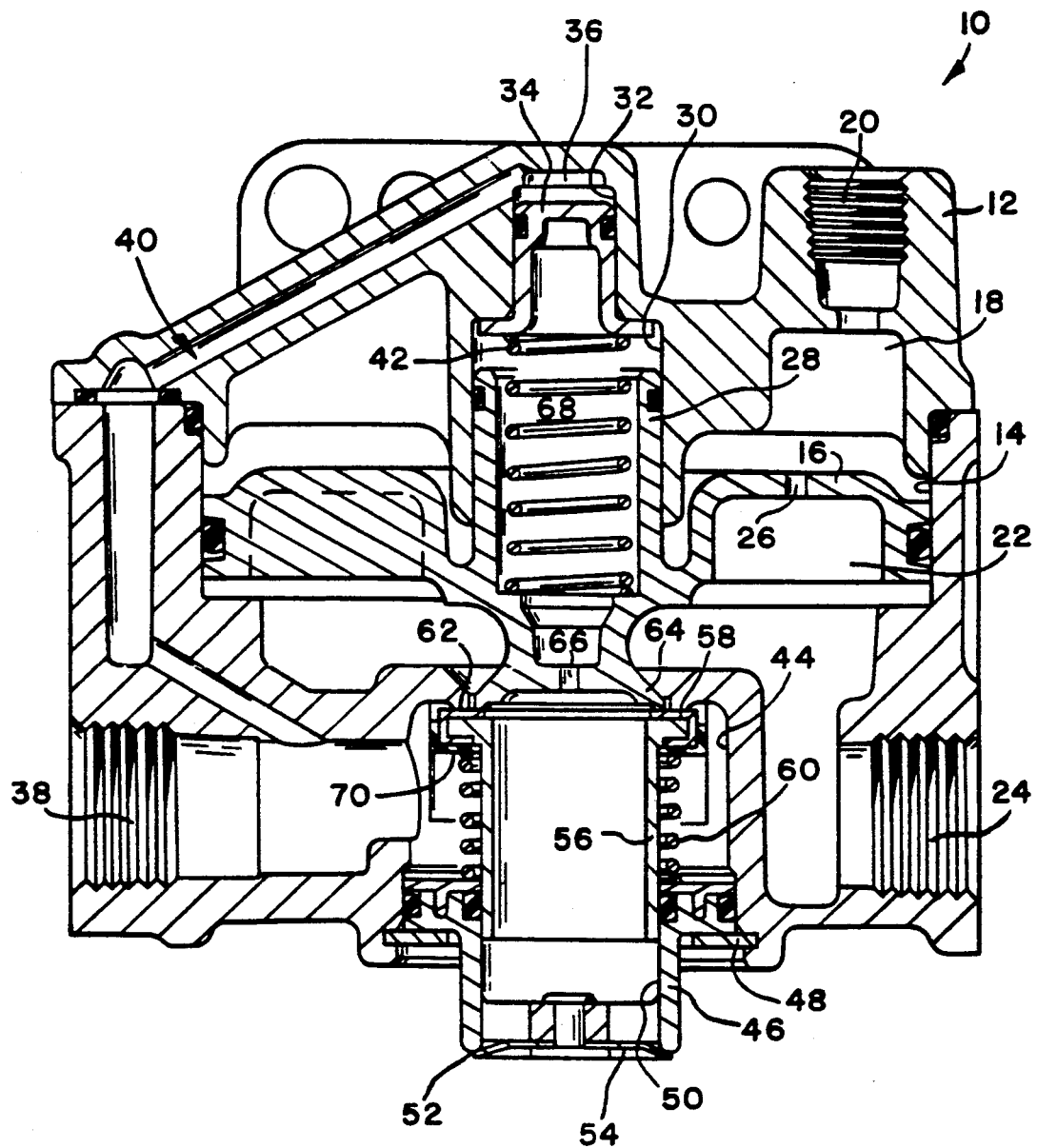

5,261,458

PILOT RELAY VALVE WITH LOAD PISTON

This invention relates to a relay valve for a fluid braking system.

Tractor-trailer combination vehicles are equipped with braking systems in which a vehicle operator generates a control signal by operation of the brake control valve in the operator's compartment. This control signal is transmitted to relay valves, which respond to the control signal to communicate compressed air from storage reservoirs to vehicle foundation brakes. The control signal must be communicated to the relay valves on the trailer through a pneumatic conduit which connects the tractor and the trailer.

More recently, so-called "turnpike trains" have become common, in which a single tractor pulls two or three trailers. Accordingly, the control signal generated by the vehicle operator must be transmitted through the first trailer to operate relay valves on the second and even a third trailer. However, when the control signal reaches the second and third trailers, it has become so slowed that unstable braking may result. Accordingly, it has become necessary to use pilot relay valves on the trailers to speed up the control signal. In other words, the control signal is used to operate a pilot relay valve, the outlet of which becomes the control signal transmitted to that trailer and each succeeding trailer. Obviously, it is desirable that such pilot relay valves used to generate control signals have an extremely small pressure differential between the control port and the outlet or delivery port, to provide nearly equal pressure at all brakes. It is also desirable that such relay valves react as quickly as possible to the control signal transmitted to the control port to minimize time delay. Accordingly, it is desirable that the crack-open pressure, at which such a relay valve opens, be as small as possible to provide adequate responsive control during braking.

The present invention provides a pilot relay valve in which a biasing piston communicated to the pressure level at the supply or inlet port of the relay valve biases the relay piston in a direction opening the combination inlet and exhaust valve. However, the force of the biasing piston applied through a reserve spring to the relay piston is opposed by the inlet/exhaust spring and the fluid pressure level at the supply or inlet port acting across the net effective area of the inlet/exhaust valve. This allows the biasing load applied to the relay piston to be greater than the spring load applied to the inlet-/exhaust valve without opening the valve. Accordingly, the crack-open pressure is minimized, and the pressure differential between the control port and outlet port of the relay valve is also minimized during normal brake application.

These and other advantages of the present invention will become apparent from the following description, with reference to the accompanying drawings, the sole Figure of which is a cross-sectional view of a relay valve made pursuant to the teachings of the present invention.

Referring now to the drawing, a relay valve generally indicated by the numeral 10 includes a housing 12 defining a bore 14 therewithin. A relay piston 16 is slidably mounted in the bore 14 and cooperates with the housing 12 to define a control volume 18 between one side of the relay piston 16 and the housing 12 which communicates with a control port 20. An outlet or delivery volume 22 is defined between the opposite side of the relay piston 16 and the housing 12, and is communicated to a delivery or outlet port 24. An orifice 26 communicates the control volume 18 with the delivery or outlet volume 22.

Relay piston 16 further includes an extension 28 which is slidably received in secondary bore 30 defined within the housing 12. Secondary bore 30 is counterbored as at 32. The counterbore 32 slidably receives a load piston 34. Load piston 34 cooperates with the housing 12 to define a load volume 36 therebetween, which is communicated with a supply or inlet port 38 through passages generally indicated by the numeral 40. Supply or inlet port 38 is communicated to a fluid pressure source, such as a storage reservoir. A reserve spring 42 yieldably biases the relay piston 16 and the load piston 34 apart, but at pressure levels above approximately 70 psi, reserve spring 42 yields to permit load piston 34 to energize relay piston 16.

The housing 12 defines still another bore 44 which communicates with the inlet or supply port 38. A separate housing member 46 is sealingly engaged with the bore 44 and retained therein by a retaining ring 48. Member 46 defines a bore 50 which communicates with an exhaust port 52. A conventional resilient valve member 54 closes the exhaust port 52, but permits fluid pressure to exhaust out of the port 52 while preventing environmental contaminants from entering the port 52.

A combination inlet/exhaust valve 56 is slidably mounted in the bore 50 and is provided with a sealing surface 58. An inlet/exhaust spring 60 urges the inlet-/exhaust valve member 56 upwardly, viewing the Figure, thereby urging the sealing surface 58 into sealing engagement with a circumferentially extending inlet valve seat 62 which circumscribes the bore 44. The relay piston 16 carries a circumferentially extending exhaust valve seat 64 which is brought into sealing engagement with the sealing surface 58 when communication between the outlet or delivery volume 22 is to be cut off from the exhaust port 52. An orifice 66 in relay piston 16 communicates the volume 68 defined within the extension 28 and within the load piston 34 with the exhaust port 52. Inlet/exhaust valve 56 further includes a fluid pressure responsive surface 70 against which pressure at supply or inlet port 38 acts. The surface 70 defines an unbalanced fluid pressure area so that the pressure at port 38 supplements the force of spring 60 in holding the sealing surface 58 against the valve seat 62.

In operation, the various components of the relay valve 10 are illustrated in the Figure in positions which they assume when pressure at the control port is vented and the brakes are released. In this condition, reservoir pressure communicated through port 38 acts across the effective area of the surface 70 to supplement the spring 60 in holding sealing surface 58 against the seat 62. However, pressure at port 38 is also communicated to load volume 36 through the passages 40, and acts against load piston 34, thereby biasing the relay piston downwardly, viewing the Figure, and thereby also exerting a biasing force on the valve member 56 which opposes the biasing force of spring 60 and of inlet pressure acting against the surface 70. The relay piston 16 is also biased downwardly by the spring 42, the force of which is smaller than the spring 60. At a predetermined supply pressure of approximately 70 psi, spring 42 yields. The effective area of the load piston 34 is slightly smaller than the effective area of the surface 0. Accordingly, the inlet/exhaust valve 56 remains sealingly engaged with the valve seat 62, but the biasing force exerted on the relay piston 16 by the load piston 34, which loads the valve seat 64 against the surface 58 in combination with the spring 42, is greater than the force applied to the valve member 56 by the spring 60 at supply pressures above approximately 100 psi, since the downwardly biasing force (viewing the Figure) applied to the inlet/exhaust valve member 56 by the load piston 34 acting through the relay piston 16 is balanced by the fluid pressure at the supply or inlet port 38 acting against the effective area of surface 70. It will be recognized, of course, that the fluid pressure at the port 38 is applied both to the surface 70 and to load piston 34.

When a brake application is effected, a pressure signal is transmitted through control port 20 into control volume 18, where it acts against the relay piston 16, urging the latter downwardly, viewing the Figure. Since the aforementioned biasing force exerted by the piston 34 is greater than the force exerted on the inlet/exhaust valve member 56 by the spring 60, any small increase in pressure in the control volume 18 will force the relay piston and the valve member 56 downwardly, viewing the Figure, causing fluid pressure to communicate from the inlet port 38 into the outlet or delivery volume 22, where it is communicated through the outlet port 24 to effect a brake application. The orifice 26 permits pressures to equalize between the volumes 18 and 22, so that pressure communicated through outlet port 24 will equalize with the pressure at the control port 20, to provide and maintain a zero pressure differential between the control port 20 and the outlet port 24.

When the vehicle operator releases the brakes, the pressure at control port 20 is vented. Accordingly, the pressure level in the outlet volume 22 urges the relay piston 16 upwardly, viewing the Figure, permitting the sealing surface 58 of inlet/exhaust valve member 56 to reengage the inlet valve seat 62, thereby closing off communication from the inlet port 38 into the volume 22. The exhaust valve seat 64 carried by the piston 16 is then lifted off the sealing surface 58, permitting high pressure at the outlet port 24 and in the volume 22 to exhaust to atmosphere through the exhaust port 52. Because the effective area of the relay piston 16 against which pressure in the volume 22 acts is much greater than the effective area of load piston 34, the fluid pressure at outlet port 24 will be exhausted to a low level even though the load volume 36 remains communicated with reservoir pressure present at inlet port 38. The pressure equalizes across the relay piston 16 and the pressure at port 24 drops to a low level through orifice 26.

When the forces applied to the relay piston 16 by fluid pressure in volume 22 and in the load volume 36 equalize, the exhaust valve seat 64 is urged back into sealing engagement with the sealing surface 58 by spring 42 and air load on piston 34 and the residual pressure in volume 22 is exhausted through the orifice 26 and through the control port 20. The valve is then returned to its initial position, in which a biasing force is exerted through the relay piston 16 to the valve member 56 by inlet fluid pressure acting against the load piston 34.

In case of a malfunction, in which the reservoir feeding the inlet port 38 is without pressure, it is still desirable to communicate a control signal to the valves fed by the outlet port 24. Accordingly, the spring 42 maintains the exhaust seat 64 in sealing engagement with the sealing surface 58, even if the pressure level at inlet port 38 drops to atmospheric pressure. Since the spring 42 has a lighter load than the spring 60, the sealing surface 58 will be maintained in sealing engagement with the inlet valve seat 62. Accordingly, when a brake application is effected and pressure is communicated through control port 20 into volume 18, pressure in volume 18 will be fed to outlet or delivery port 24 through the orifice 26 and the volume 22. Although the signal will be relatively slow, pressure will be available through the outlet port 24 to provide braking.

We claim:

1. Relay valve comprising a housing having an inlet port, an outlet port, an exhaust port, and a control port, valve means for controlling communication between said inlet port, said outlet port, and said exhaust port, a relay piston slidably mounted in said housing and responsive to the pressure level at said control port for operating said valve means, and pressure responsive biasing means for applying a biasing level at said control port, said pressure responsive biasing means including a fluid pressure effective area responsive to the pressure level at said inlet port, said variable biasing force being generated by the fluid pressure at said inlet port acting against said effective area, said valve means including a pressure responsive surface communicated with the fluid pressure level at said inlet port, said relay piston transmitting the biasing force applied by said pressure responsive biasing means to said valve means, the fluid pressure acting on the pressure responsive surface of said valve means opposing the fluid pressure acting on the effective area of the biasing means, the pressure responsive surface on the valve means being larger than the size of the effective area of the pressure responsive biasing means.

2. Relay valve as claimed in claim 1, wherein the biasing force varies as a function of the pressure level at the inlet port.

3. Relay valve as claimed in claim 1, wherein said relay piston includes an orifice communicating said control port with the outlet port.

4. Relay valve comprising a housing having an inlet port, an outlet port, an exhaust port, and a control port, valve means for controlling communication between said inlet port, said outlet port, and said exhaust port, a relay piston slidably mounted in said housing and responsive to the pressure level at said control port for operating said valve means, and pressure responsive biasing means for applying a biasing force on said relay piston independently of the pressure level at said control port, said pressure responsive biasing means including a fluid pressure effective area responsive to the pressure level at said inlet port, said variable biasing force being generated by the fluid pressure at said inlet port acting against said effective area, said valve means including a spring device yieldably urging said valve means to a position closing said inlet port and acting on said valve means in a direction opposite to the force applied to said valve means by said biasing means, spring means yieldably urging said relay piston into engagement with said valve means, the force exerted by said spring means being less than the force exerted by said spring device.

5. Relay valve as claimed in claim 4, wherein said valve means includes a pressure responsive surface communicated with the fluid pressure level at said inlet port, said relay piston transmitting the biasing force applied by said pressure responsive biasing means to said valve means, the fluid pressure acting on the pressure responsive surface of said valve means opposing the fluid pressure acting on the effective area of the biasing means.

6. Relay valve comprising a housing having an inlet port, an outlet port, an exhaust port, and a control port, valve means for controlling communication between said inlet port, said outlet port, and said exhaust port, a relay piston slidably mounted in said housing and responsive to the pressure level at said control port for operating said valve means, and pressure responsive biasing means for applying a biasing force on said relay piston independently of the pressure level at said control port, said valve means including a pressure responsive surface responsive to the fluid pressure level at the inlet port, and a spring supplementing the force of said fluid pressure level on said surface, said relay piston transmitting the biasing force applied by said pressure responsive biasing means to said valve means, the force of fluid pressure acting on said fluid pressure responsive surface and said spring opposing the variable biasing force of said pressure responsive biasing means, the variable biasing force of said pressure responsive biasing means being greater than the force of said spring but less than the sum of the forces of the spring and said force of fluid pressure acting on the pressure responsive surface.

7. Relay valve as claimed in claim 6, wherein said pressure responsive biasing means includes a fluid pressure effective area responsive to the pressure level at said inlet port, said variable biasing force being generated by the fluid pressure at said inlet port acting against said effective area.

8. Relay valve as claimed in claim 7, wherein said valve means includes a spring device yieldably urging said valve means to a position closing said inlet port and acting on said valve means in the same direction as the fluid pressure acting against said pressure responsive surface and opposite to the force applied to said valve means by said biasing means.

9. Relay valve as claimed in claim 7, wherein said valve means includes a spring device yieldably urging said valve means to a position closing said inlet port and acting on said valve means in a direction opposite to the force applied to said valve means by said biasing means.

* * * * *